United States Patent [19]
Yonezawa et al.

[11] Patent Number: 5,714,749
[45] Date of Patent: Feb. 3, 1998

[54] FOCUS DETECTING APPARATUS AND MICROSCOPE APPARATUS EQUIPPED WITH THE FOREGOING APPARATUS

[75] Inventors: Yasuo Yonezawa, Zushi; Jiro Mizuno; Masahiko Otomo, both of Fujisawa, all of Japan

[73] Assignee: Nikon Corporation, Tokyo, Japan

[21] Appl. No.: 616,651

[22] Filed: Mar. 15, 1996

[30] Foreign Application Priority Data

Mar. 15, 1995 [JP] Japan ................... 7-083407

[51] Int. Cl.$^6$ ........................................ G01J 1/20
[52] U.S. Cl. ..................... 250/201.2; 250/201.3; 355/55; 396/79
[58] Field of Search .................... 250/201.3, 201.5, 250/548, 201.2; 356/399–401; 355/55, 56, 53, 44; 359/368, 554, 711, 708; 396/111, 80, 79, 91

[56] References Cited

U.S. PATENT DOCUMENTS

| | | | |
|---|---|---|---|
| 3,721,827 | 3/1973 | Reinheimer | 250/201.2 |
| 4,798,948 | 1/1989 | Neumann et al. | 250/201.2 |
| 5,440,367 | 8/1995 | Suda | 396/111 |

*Primary Examiner*—Que Le
*Attorney, Agent, or Firm*—Foley & Lardner

[57] ABSTRACT

A focus detecting apparatus of the present invention comprises (a) an image projection unit which projects a first checking light through a first region out of two regions formed by splitting a space into two along a border plane including the optical axis of the objective optical system including the measured object to form an image of the light source thereon, and (b) an image detection unit which condenses a second checking light emerging from the image of the light source through the second region opposed to the first region with the border plane inbetween, on a light-receiving surface of a photodetector to form image of the measured object thereon. The image projection unit comprises a first converging optical system, which has a first refractive power in a first plane parallel to the border plane, which has a second refractive power substantially different from the first refractive power in a second plane parallel to the optical axis of the objective optical system and perpendicular to the border plane. The apparatus so arranged can be substantially free of influence of light scattering at a level-difference edge on the object surface and can maintain a high utilization factor of light, whereby it can detect the focus information of the objective optical system on the object with high accuracy.

26 Claims, 7 Drawing Sheets

FOCUS DETECTING APPARATUS AND MICROSCOPE APPARATUS EQUIPPED WITH THE FOREGOING APPARATUS

BACKGROUND OF THE INVENTION

1. Field of the Invention

The present invention relates to a focus detecting apparatus used in optical instruments for forming an image of an object through an objective optical system and functioning to detect a positional relation between the focus of the objective optical system and the object to be measured. More particularly, the invention relates to the focus detecting apparatus mounted in microscopes for observing surface conditions, for example, of metals, semiconductors, or liquid crystals, particularly mounted in microscope apparatus for inspecting surfaces of semiconductor wafers and functioning to detect focus information of the objective optical system on the object to be measured.

2. Related Background Art

The conventional focus detecting apparatus of a light-source projection method used in vertical illumination type microscopes is arranged, for example as disclosed in U.S. Pat. No. 4,798,948, in such a manner that a light-source image is projected and focused directly on the measured object and a reflection image from the measured object is detected by a light-receiving device. Namely, a point image is formed as a light-source image on the measured object in the light-source projection method.

Such conventional focus detecting apparatus of the light-source projection method has the high utilization factor of light and the high detection accuracy as long as a surface of an object to be observed is as flat as a mirror surface.

Another conventional focus detecting apparatus of a slit projection method used in the vertical illumination type microscopes is arranged, for example as disclosed in U.S. Pat. No. 3,721,827, in such a manner that a slit image is projected and focused on the object to be measured and a reflection image from the measured object is detected by the light-receiving device.

Since such conventional focus detecting apparatus of the slit projection method shows a low rate of light energy scattered by a level-difference edge on the occasion where the slit image runs across a level-difference edge of a pattern formed on the measured object, the apparatus is substantially free of influence of scattering by the pattern edge on the detection accuracy.

SUMMARY OF THE INVENTION

An object of the present invention is to provide a focus detecting apparatus for detecting focus information of the objective optical system on the object to be measured with high accuracy as substantially suppressing the influence of optical scattering due to the level-difference edge on the object surface and keeping the utilization factor of light high, and also to provide a microscope apparatus equipped with the foregoing apparatus.

In order to achieve the above object, the focus detecting apparatus of the present invention is a focus detecting apparatus for detecting focus information of an objective optical system on a measured object, comprising: (i) an image projection unit comprising a light source for emitting first checking light, the image projection unit projecting the first checking light through a first region out of two regions formed by splitting a space into two along a border plane including an optical axis of the objective optical system, onto a surface of the measured object to form an image of the light source thereon; and (ii) an image detection unit comprising a photodetector for detecting second checking light emitted from the image of the light source, the image detection unit condensing the second checking light through a second region opposed to the first region with the border plane inbetween, on a light-receiving surface of the photodetector to form an image of the measured object thereon.

The image projection unit comprises a first converging optical system having a first refractive power in a first plane parallel to the border plane, having a second refractive power, substantially different from the first refractive power, in a second plane parallel to the optical axis of the objective optical system and perpendicular to the border plane, and shaping the image of the light source as expanding the image in a direction along an intersecting line between the border plane and the measured object.

In the above focus detection apparatus, the first converging optical system preferably is a toric lens which is set so as to converge the first checking light incident thereinto from the light source through the first region on a focal plane on a side of the light source in the objective optical system in the first plane and so as to convert the first checking light into a beam parallel to the optical axis of the objective optical system in the second plane. More preferably, the first converging optical system has a positive refractive power as the first refractive power and has the refractive power of zero as the second refractive power.

Here, a desired arrangement is such that the image projection unit comprises a condensing optical system for condensing the first checking light emitted from the light source, and a light-shielding optical system for intercepting the first checking light traveling in the second region and transmitting the first checking light traveling in the first region among the first checking light emerging from the condensing optical system, that the image detection unit comprises an imaging optical system for converging the second checking light passing through the second region among the second checking light emerging from the image of the light source, on the light-receiving surface of the photodetector, and that the image projection unit and the image detection unit share an optical-path splitting optical system, disposed in an optical path between the light-shielding optical system and the objective optical system, for guiding the first checking light from the light-shielding optical system to the objective optical system and for guiding the second checking light from the objective optical system to the imaging optical system.

On one hand, in the case wherein the image projection unit and the image detection unit share the first converging optical system disposed in an optical path between the optical-path splitting optical system and the objective optical system, a more desired arrangement is such that the condensing optical system is a collimator lens for converting the first checking light emitted from the light source into a light beam parallel to the optical axis of the objective optical system, and that the first converging optical system is a cylindrical lens having the positive refractive power as the first refractive power and having a refractive power of zero as the second refractive power, the cylindrical lens converging the first checking light emerging from the optical-path splitting optical system on an intersecting line between the first plane including the optical axis of the objective optical system and the focal plane on the side of the light source in the objective optical system.

On the other hand, in the case wherein the image projection unit has the first converging optical system disposed in an optical path between the light-shielding optical system and the optical-path splitting optical system and wherein the image detection unit comprises a second converging optical system disposed in symmetry with the first converging optical system with respect to the optical-path splitting optical system in an optical path between the optical-path splitting optical system and the imaging optical system, the second converging optical system having a substantially same structure as the first converging optical system, a more desired arrangement is such that the condensing optical system is a collimator lens for converting the first checking light emitted from the light source into a light beam parallel to the optical axis of the objective optical system, and that the first converging optical system is a cylindrical lens having a positive refractive power as the first refractive power and the refractive power of zero as the second refractive power, the cylindrical lens converging the first checking light emerging from the light-shielding optical system on an intersecting line between the first plane including the optical axis of the objective optical system and the focal plane on the side of the light source in the objective optical system.

In the above focus detecting apparatus, the first converging optical system preferably is a toric mirror which is set so as to converge the first checking light incident thereto from the light source through the first region, on the focal plane on the side of the light source in the objective optical system in the first plane and so as to convert the first checking light into a light beam parallel to the optical axis of the objective optical system in the second plane. In this case, the first converging optical system more preferably has a positive refractive power as the first refractive power and has the refractive power of zero as the second refractive power.

Here, a preferred arrangement is such that the image projection unit comprises a condensing optical system for condensing the first checking light emitted from the light source, and a light-shielding optical system for intercepting the first checking light traveling in the second region and transmitting the first checking light traveling in the first region among the first checking light emerging from the condensing optical system, that the image detection unit comprises an imaging optical system for converging the second checking light passing through the second region among the second checking light emerging from the image of the light source, on the light-receiving surface of the photodetector, and that the image projection unit and the image detection unit share an optical-path splitting optical system, disposed in an optical path between the light-shielding optical system and the objective optical system, for guiding the first checking light from the light-shielding optical system to the objective optical system and for guiding the second checking light from the objective optical system to the imaging optical system, and the first converging optical system disposed in an optical path between the optical-path splitting optical system and the objective optical system.

A more desired arrangement is such that the condensing optical system is a collimator lens for converting the first checking light emitted from the light source into a light beam parallel to the optical axis of the objective optical system, and that the first converging optical system is a mirror having a positive refractive power as the first refractive power and having the refractive power of zero as the second refractive power, the mirror converging the first checking light emerging from the optical-path splitting optical system on an intersecting line between the first plane including the optical axis of the objective optical system and the focal plane on the side of the light source in the objective optical system.

Further, in the above focus detecting apparatus, the photodetector preferably comprises a light-receiving device for receiving the image of the measured object and photoelectrically converting the image received into an electric signal, and an arithmetic unit for analyzing a shape of the image of the measured object, based on the electric signal output from the light-receiving device, thereby detecting a deviation of the image of the measured object relative to the optical axis of the objective optical system, as the focus information of the objective optical system on the measured object.

Next, in order to achieve the above object, the microscope apparatus of the present invention is a microscope apparatus for projecting an optical image of a measured object as enlarging the optical image into an observable size, comprising: (a) a stage for holding the measured object; (b) an illumination unit for projecting illumination light onto the measured object; (c) an objective optical system for condensing measurement light emerging from the measured object to focus the measurement light as an image of the measured object; (d) an eyepiece optical system for projecting the measurement light emerging from the image of the measured object as enlarging the measurement light; (e) a focus detecting apparatus for detecting focus information of the objective optical system on the measured object; (f) a control unit for controlling a relative positional relation between the objective optical system and the stage so as to make a focal point on a side of the measured object in the objective optical system coincident in a predetermined permissible range with a surface of the measured object, based on an electric signal output from the focus detecting apparatus; and (g) a drive unit for relatively displacing a position of the objective lens relative to a position of the stage along the optical axis of the objective optical system, based on an electric signal output from the control unit.

The focus detecting apparatus comprises (i) an image projection unit comprising a light source for emitting first checking light, the image projection unit projecting the first checking light through a first region out of two regions formed by splitting a space into two along a border plane including an optical axis of the objective optical system, onto a surface of the measured object to form an image of the light source thereon; and (ii) an image detection unit comprising a photodetector for detecting second checking light emitted from the image of the light source, the image detection unit condensing the second checking light through a second region opposed to the first region with the border plane inbetween, on a light-receiving surface of the photodetector to form an image of the measured object thereon.

The image projection unit comprises a first converging optical system having a first refractive power in a first plane parallel to the border plane, having a second refractive power, substantially different from the first refractive power, in a second plane parallel to the optical axis of the objective optical system and perpendicular to the border plane, and shaping the image of the light source as expanding the image in a direction along an intersecting line between the border plane and the measured object.

In the above microscope apparatus, the first converging optical system preferably is a toric lens which is set so as to converge the first checking light incident thereinto from the light source through the first region on a focal plane on a side of the light source in the objective optical system in the first plane and so as to convert the first checking light into a beam parallel to the optical axis of the objective optical system in the second plane.

Here, a desired arrangement is such that the image projection unit comprises a condensing optical system for condensing the first checking light emitted from the light source, and a light-shielding optical system for intercepting the first checking light traveling in the second region and transmitting the first checking light traveling in the first region among the first checking light emerging from the condensing optical system, that the image detection unit comprises an imaging optical system for converging the second checking light passing through the second region among the second checking light emerging from the image of the light source, on the light-receiving surface of the photodetector, and that the image projection unit and the image detection unit share a first optical-path splitting optical system, disposed between the light-shielding optical system and the objective optical system, for guiding the first checking light from the light-shielding optical system to the objective optical system and for guiding the second checking light from the objective optical system to the imaging optical system, and a second optical-path splitting optical system, disposed in an optical path between the first optical-path splitting optical system and the objective optical system, for guiding the first checking light from the first optical-path splitting optical system to the objective optical system, for guiding the second checking light from the objective optical system to the first optical-path splitting optical system, and for guiding the measurement light from the objective optical system to the eyepiece optical system.

On one hand, in the case wherein the image projection unit and the image detection unit share the first converging optical system disposed in an optical path between the first optical-path splitting optical system and the second optical-path splitting optical system, a more desired arrangement is such that the condensing optical system is a collimator lens for converting the first checking light emitted from the light source into a light beam parallel to the optical axis of the objective optical system, and that the first converging optical system is a cylindrical lens having a positive refractive power as the first refractive power and having the refractive power of zero as the second refractive power, the cylindrical lens converging the first checking light emerging from the first optical-path splitting optical system on an intersecting line between the first plane including the optical axis of the objective optical system and the focal plane on the side of the light source in the objective optical system.

On the other hand, in the case wherein the image projection unit has the first converging optical system disposed in an optical path between the light-shielding optical system and the first optical-path splitting optical system and wherein the image detection unit comprises a second converging optical system disposed in symmetry with the first converging optical system with respect to the first optical-path splitting optical system in an optical path between the first optical-path splitting optical system and the imaging optical system, the second converging optical system having a substantially same structure as the first converging optical system, a more desired arrangement is such that the condensing optical system is a collimator lens for converting the first checking light emitted from the light source into a light beam parallel to the optical axis of the objective optical system, and that the first converging optical system is a cylindrical lens having a positive refractive power as the first refractive power and the refractive power of zero as the second refractive power, the cylindrical lens converging the first checking light emerging from the light-shielding optical system on an intersecting line between the first plane including the optical axis of the objective optical system and the focal plane on the side of the light source in the objective optical system.

In the above microscope apparatus, the first converging optical system preferably is a toric mirror which is set so as to converge the first checking light incident thereto from the light source through the first region, on the focal plane on the side of the light source in the objective optical system in the first plane and so as to convert the first checking light into a light beam parallel to the optical axis of the objective optical system in the second plane.

Here, a desired arrangement is such that the image projection unit comprises a condensing optical system for condensing the first checking light emitted from the light source, and a light-shielding optical system for intercepting the first checking light traveling in the second region and transmitting the first checking light traveling in the first region among the first checking light emerging from the condensing optical system, that the image detection unit comprises an imaging optical system for converging the second checking light passing through the second region among the second checking light emerging from the image of the light source, on the light-receiving surface of the photodetector, and that the image projection unit and the image detection unit share a first optical-path splitting optical system, disposed in an optical path between the light-shielding optical system and the objective optical system, for guiding the first checking light from the light-shielding optical system to the objective optical system and for guiding the second checking light from the objective optical system to the imaging optical system, and a second optical-path splitting optical system, disposed in an optical path between the first optical-path splitting optical system and the objective optical system, for guiding the first checking light from the first optical-path splitting optical system to the objective optical system, for guiding the second checking light from the objective optical system to the first optical-path splitting optical system, and for guiding the measurement light from the objective optical system to the eyepiece optical system.

Further, a more desired arrangement is such that the condensing optical system is a collimator lens for converting the first checking light emitted from the light source into a light beam parallel to the optical axis of the objective optical system, and that the first converging optical system is a mirror having a positive refractive power as the first refractive power and having the refractive power of zero as the second refractive power, the mirror converging the first checking light emerging from the first optical-path splitting optical system on an intersecting line between the first plane including the optical axis of the objective optical system and the focal plane on the side of the light source in the objective optical system.

Further, in the above microscope apparatus, the photodetector preferably comprises a light-receiving device for receiving the image of the measured object and photoelectrically converting the image received into an electric signal, and an arithmetic unit for analyzing a shape of the image of the measured object, based on the electric signal output from the light-receiving device, thereby detecting a deviation of the image of the measured object relative to the optical axis of the objective optical system, and outputting the deviation as the focus information of the objective optical system on the measured object, to the control unit. The drive unit preferably moves the stage along the optical axis of the objective optical system, based on an electric signal output from the control unit. The illumination unit preferably comprises a vertical illumination optical system for emitting the illumination light, and third optical-path splitting means, disposed in an optical path between the vertical illumination optical system and the objective optical system, for guiding the illumination light from the vertical illumination optical system to the objective optical system and for guiding the measurement light from the objective optical system to the eyepiece optical system.

The focus detecting apparatus constructed as explained above is provided with the optical means having the different refractive powers along the two mutually orthogonal directions, for example the toric lens or the toric mirror. Then the action of the toric lens or the toric mirror shapes the light-source image formed on the object into an elongate image along the predetermined direction, for example into a slit image (or a line image). In this manner the slit image can be projected onto the object plane as minimizing the losses of the light from the light source. Accordingly, the focus detecting apparatus of the present invention is not easily affected by a level-difference edge on the object plane as achieving the light-source projection method with a high utilization factor of light.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

The constitution and operation of the embodiments of the focus detecting apparatus according to the present invention and the microscope apparatus equipped with the foregoing apparatus will be explained in detail with reference to FIG. 1 to FIG. 7. In the description with the drawings, same elements will be denoted by same reference numerals and redundant description will be omitted. It is also noted that the dimensional scales of the drawings are not always coincident with those in the description.

First Embodiment

Figure 1:
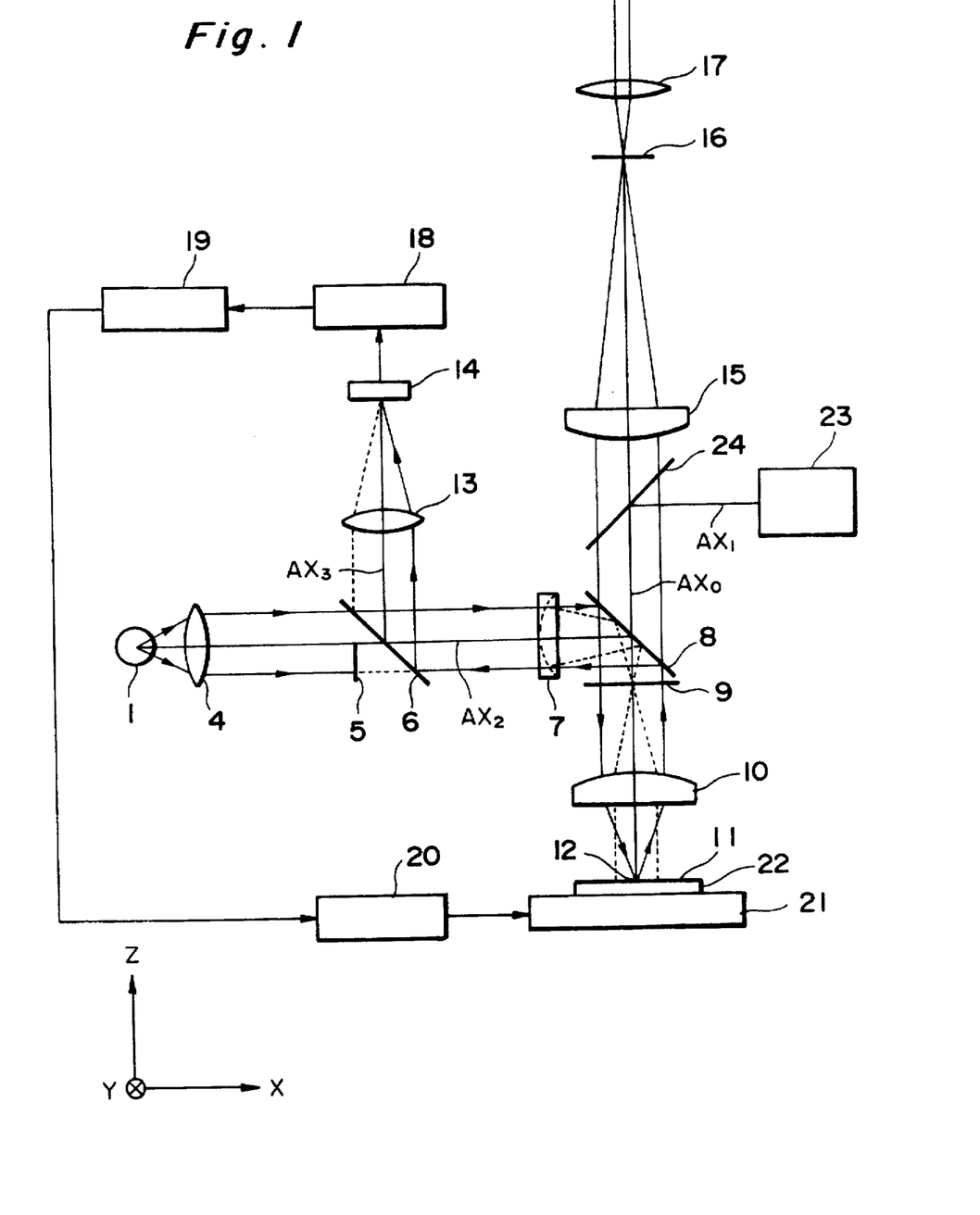
FIG. 1 is a side view of the vertical illumination microscope apparatus of Embodiment 1 and the automatic focus detecting apparatus mounted in the microscope apparatus, schematically showing the overall configuration thereof.

As shown in FIG. 1, the vertical illumination microscope apparatus of the present embodiment is provided with an objective optical system consisting of a first objective lens 10 and a second objective lens 15, as opposed to a measured object 22 to be observed. This vertical illumination microscope apparatus is further provided with an optical-path splitting optical system consisting of a first half mirror 24 and an eyepiece optical system consisting of an eyepiece 17, as arranged along the optical axis $AX_0$ of the objective optical system, which is parallel to the Z-axis direction.

Here, the optical path between the first objective lens 10 and the second objective lens 15 is set as an infinite beam path (parallel beam path). The eyepiece 17 is disposed as opposed to the second objective lens 15 with a front focal plane 16 of the second objective lens 15 inbetween.

Here, the first half mirror 24 is placed so that a semi-transparent surface thereof may be located as inclined at an angle of 45° relative to the optical axis $AX_0$ of the objective optical system. This makes the optical axis $AX_1$ of a vertical illumination optical system 23 extend in parallel with the X-axis direction and normally intersect with the optical axis $AX_0$ of the objective optical system on the semi-transparent surface of the first half mirror 24. The first half mirror 24 and vertical illumination optical system 23 compose an illumination unit for vertically illuminating the measured object 22.

The measured object 22 is held on a surface of stage 21 and is located in the proximity of a rear focal plane 11 of the first objective lens 10. This stage 21 is arranged as capable of three-dimensionally moving the position of the measured object 22, based on a drive electric signal output from a drive unit 20. Particularly, the stage 21 can finely adjust the position of the measured object 22 along the optical axis $AX_0$ of the objective optical system.

A control unit 19 outputs a control electric signal to the drive unit 20 in order to control the positional relation between the first objective lens 10 and the stage 21 so as to align the surface of the measured object 22 with the rear focal plane 11 of the first objective lens 10 within a predetermined permissible range, based on an arithmetic electric signal output from the focus detecting apparatus as detailed below. The drive unit 20 outputs a drive electric signal to the stage 21 in order to displace the position of the stage 21 along the optical axis $AX_0$ of the objective optical system, based on the control electric signal output from the control unit 19.

This microscope apparatus is equipped with the focus detecting apparatus for detecting focus information of the first objective lens 10 on the measured object 22. This focus detecting apparatus is provided with an image projection unit for projecting first checking light emitted from a light source 1 to the surface of the measured object 22 and an image detection unit for detecting second checking light emerging from the surface of the measured object 22.

On one hand, the image projection unit includes a condensing optical system consisting of a collimator lens 4, as opposed to the light source 1. This image projection unit further includes a light-shielding optical system consisting of a half stop 5, an optical-path splitting optical system consisting of a half mirror 6, a converging optical system consisting of a cylindrical lens 7, and another optical-path splitting optical system consisting of a dichroic mirror 8, as arranged along the optical axis $AX_2$ of the condensing optical system, which is parallel to the X-axis direction.

The light source 1 is placed at the front focal point of the collimator lens 4. The half stop 5 is constructed of a member opaque to the first checking light and is set with an edge thereof being arranged as extending in parallel with the Y-axis direction in the XY plane including the optical axis $AX_2$ of the condensing optical system.

Here, the dichroic mirror 8 is set with a semi-transparent surface thereof being arranged as inclined at an angle of 45° relative to the optical axis $AX_0$ of the objective optical system, at the position opposed to the first objective lens 10 with the front focal plane 9 of the first objective lens 10 inbetween. This makes the optical axis $AX_2$ of the condensing optical system normally intersect with the optical axis $AX_0$ of the objective optical system on the semi-transparent surface of the dichroic mirror 8. This dichroic mirror 8 is constructed of a semi-transparent member having the selectivity to the wavelength of the illumination light and measurement light and the wavelength of the first and second checking light.

The cylindrical lens 7 is a toric lens having a positive refractive power in the XY plane and the refractive power of zero in the XZ plane. This cylindrical lens 7 functions to converge the first checking light on the front focal plane 9 of the first objective lens 10 in the YZ plane, to convert the first checking light into a light beam parallel to the optical axis $AX_0$ of the objective optical system in the XZ plane, and to convert the second checking light into a light beam parallel to the optical axis $AX_2$ of the condensing optical system in the XY plane and in the XZ plane.

On the other hand, the image detection unit shares the dichroic mirror 8, the cylindrical lens 7, and the second half mirror 6, arranged along the optical axis $AX_2$ of the condensing optical system, with the image projection unit, and further includes an imaging optical system consisting of an imaging lens 13. This image detection unit further includes a light-receiving device 14, as arranged along the optical axis $AX_3$ of the imaging optical system, which is parallel to the Z-axis direction.

Here, the second half mirror 6 is set with a semi-transparent surface thereof being arranged as inclined at an angle of 45° relative to the optical axis $AX_2$ of the condensing optical system. This makes the optical axis $AX_3$ of the imaging optical system normally intersect with the optical axis $AX_2$ of the condensing optical system on the semi-transparent surface of the second half mirror 6.

Further, the light-receiving device 14 is set with a light-receiving surface thereof substantially being located on the rear focal plane of the imaging lens 13. This light-receiving element 14 receives an image of the measured object 22 to photoelectrically convert it into an electric signal and then output the detection electric signal to an arithmetic unit 18. The arithmetic unit 18 analyzes the configuration of the image of the measured object 22, based on the detection electric signal output from the light-receiving device 14, to execute an arithmetic of focus information of the first objective lens 10 on the measured object 22, and outputs an arithmetic electric signal to the control unit 19. The light-receiving device 14 and arithmetic unit 18 compose a photodetector for detecting the image of the measured object 22.

In the microscope apparatus as constructed in the above arrangement, the illumination light emitted from the vertical illumination optical system 23 is reflected by the first half mirror 24 and thereafter emerges from the first objective lens 10 to become a light beam parallel to the optical axis of the objective optical system. This causes the measured object 22 to be vertically illuminated with the illumination light having a nearly uniform illuminance distribution in the XY plane.

Then the measurement light emerging from the measured object 22 is condensed by the first objective lens 10, thereafter travels through the dichroic mirror 8 and first half mirror 24, emerges from the second objective lens as being converged, and then forms the image of the measured object 22 on the front focal plane 16 of the second objective lens 15 as an image plane. The image of measured object 22 formed on the image plane 16 is projected as enlarged through the eyepiece 17 to be observed as an object image by the naked eye of an operator.

In the focus detecting apparatus mounted in this microscope apparatus, the first checking light emitted from the light source 1 is converted into a parallel beam by the collimator lens 4 and thereafter is incident to the half stop 5. This half stop 5 has the edge extending in parallel with the Y-axis direction in the XY plane including the optical axis $AX_2$ of the condensing optical system.

Because of the above arrangement, a light beam located in the –Z direction with respect to the optical axis $AX_2$ of the condensing optical system in the first checking light from the collimator lens 4 is intercepted by the half stop 5, and another half beam located in the +Z direction with respect to the optical axis $AX_2$ of the condenser optical system is incident into the half mirror 6. The first checking light passing through the half mirror 6 travels through the optical path located in the +Z direction with respect to the optical axis of the collimator lens 4 to enter the cylindrical lens (or toric lens) 7.

Figure 2:
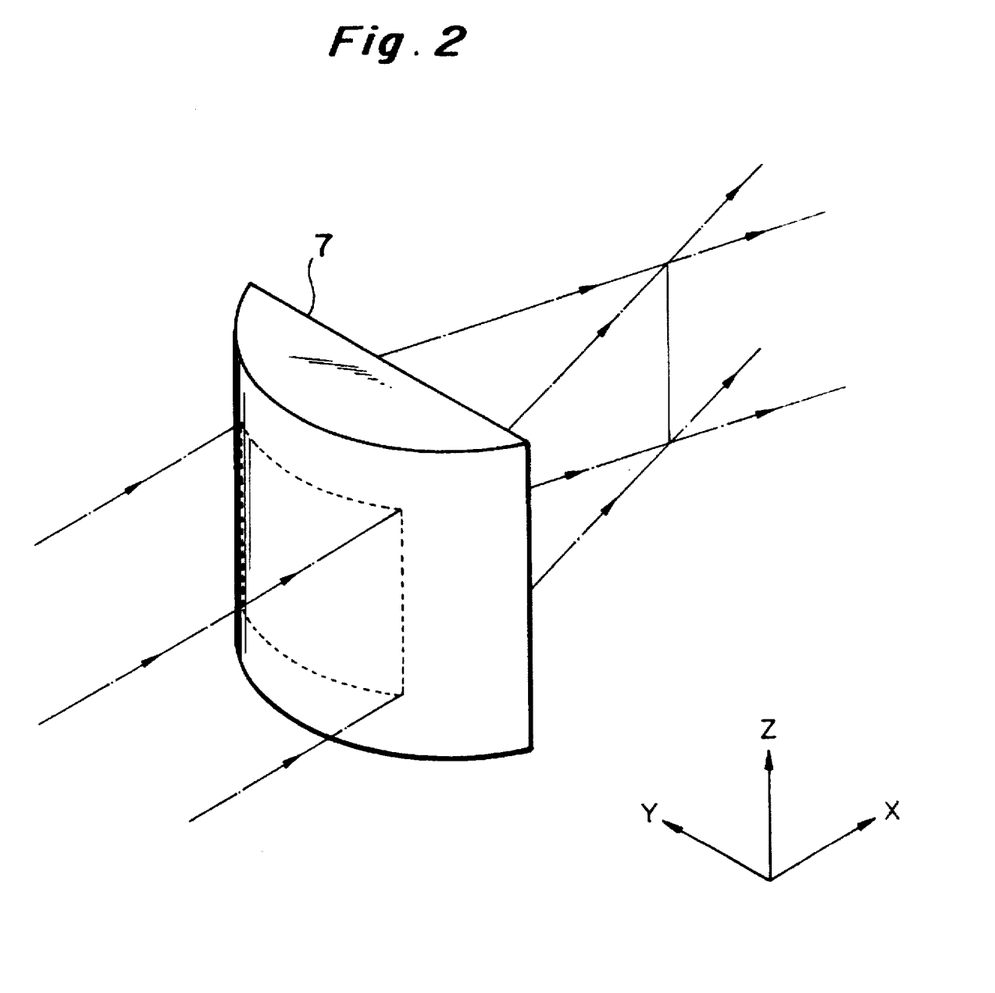
FIG. 2 is a perspective view to show a principle of the action of the cylindrical lens in the automatic focus detecting apparatus of FIG. 1.

As shown in FIG. 2, neither the light-source-side surface nor the objective-lens-side surface of the cylindrical lens 7 has curvature (as shown by the solid line in FIG. 1) in the XZ plane or the meridional plane of beam. Because of it, the cylindrical lens 7 functions as a plane-parallel plate in the meridional plane.

On the other hand, in the XY plane or the sagittal plane of beam, the light-source-side surface of the cylindrical lens 7 has the curvature convex on the light source side, but the objective-lens-side surface has no curvature (as shown by the dashed line in FIG. 1). Because of it, the cylindrical lens 7 functions as a positive lens in the sagittal plane.

As explained, the cylindrical lens 7 is the toric lens having no refractive power in the plane perpendicular to the edge of the half stop 5 intersecting with the optical axis $AX_2$ of the condensing optical system, but having a positive refractive power in the plane parallel to the edge of the half stop 5 and the optical axis $AX_2$ of the condensing optical system. The cylindrical lens 7 is positioned so as to focus the first checking light in the form of a line being parallel to the X-axis direction and intersecting with the optical axis $AX_0$ of the objective optical system on the light-source-side focal plane 9 of the first objective lens 10.

In the meridional plane of beam the parallel first checking light having passed through the cylindrical lens 7 as a plane-parallel plate (as shown by the solid line in FIG. 1) thus travels through the optical path located in the +Z direction with respect to the optical axis $AX_2$ of the condensing optical system to enter the dichroic mirror 8, as shown in FIG. 1. The parallel first checking light reflected into the –Z direction by the dichroic mirror 8 then travels through the optical path located in the –X region with respect to the optical axis $AX_0$ of the objective optical system to enter the first objective lens 10 in the infinite system and then to be focused on the object-side focal plane 11 of the first objective lens 10.

Figure 3:
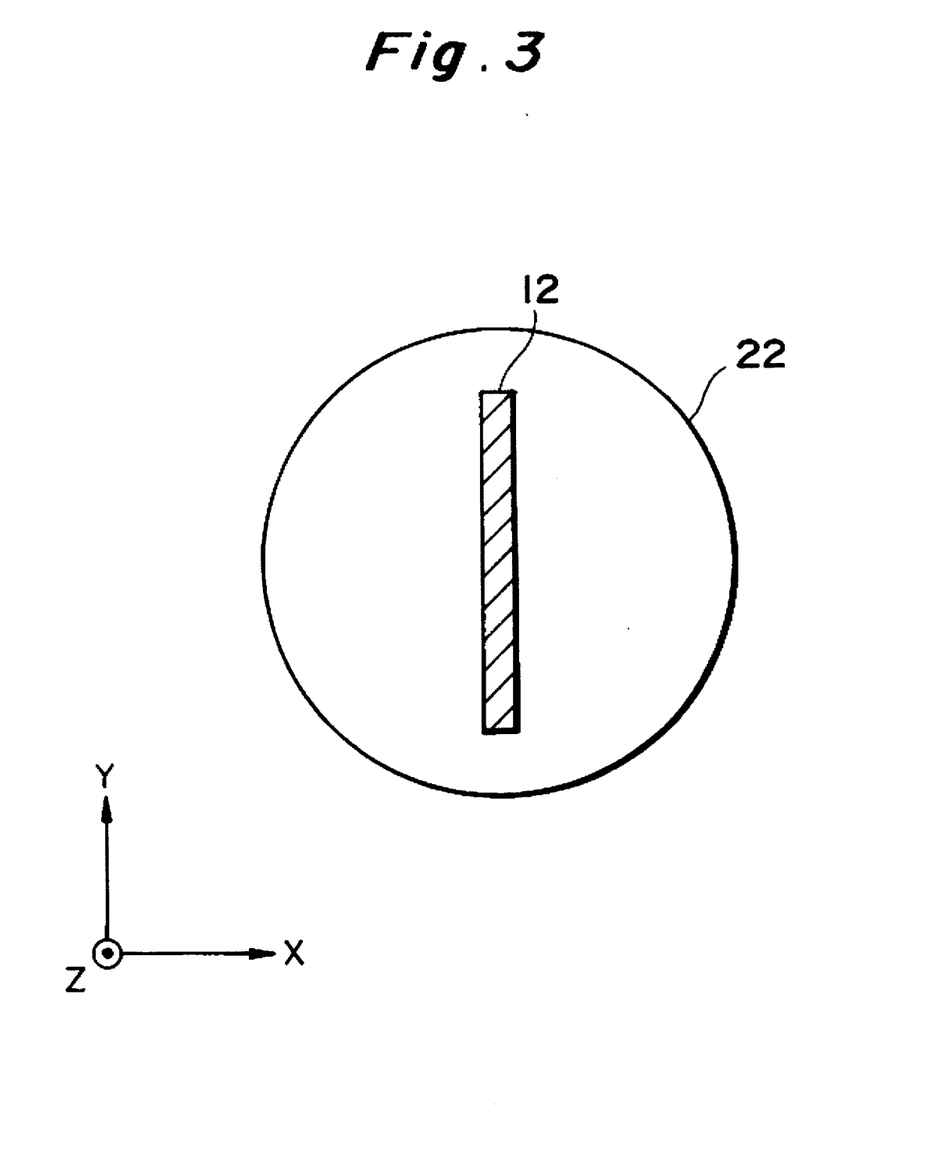
FIG. 3 is a top plan view to show an image formed on the surface of the object to be measured in the vertical illumination microscope apparats of FIG. 1.

On the other hand, in the sagittal plane of beam, the first checking light refracted (as shown by the dashed line in FIG. 1) by the cylindrical lens 7 as a positive lens travels via the dichroic mirror 8 to be condensed on the light-source-side focal plane 9 of the first objective lens 10 (at the position of the pupil of the first objective lens 10). The first checking light diverging from the light-source-side focal plane 9 of the first objective lens 10 is converted into parallel light through the first objective lens 10 to impinge on the measured object 22. When the surface of the measured object 22 is located in an in-focus state with the object-side focal plane 11 of the first objective lens 10, as shown in FIG. 3, a slit image 12 extending along the Y-axis direction corresponding to the edge direction of the half stop 5 as a light-shielding optical system and intersecting with the optical axis $AX_0$ of the objective optical system is formed as an image of light source 1. If the surface of the measured object 22 were defocused from the object-side focal plane 11 of the first objective lens 10, the slit image 12 would be formed as deviated from the optical axis $AX_0$ of the objective optical system.

The second checking light (as shown by the solid line in FIG. 1) in the meridional plane of beam emerging from the slit image 12 formed on the measured object 22 as shown in FIG. 1 is changed into parallel light by the first objective lens 10 in the infinite system and thereafter travels through the optical path located in the +X direction with respect to the optical axis $AX_0$ of the objective optical system to enter the dichroic mirror 8. The second checking light reflected in the −X direction by the dichroic mirror 8 travels through the optical path located in the −X direction with respect to the optical axis $AX_2$ of the condensing optical system to enter the cylindrical lens 7. The second checking light passing through the cylindrical lens 7 functioning as a plane-parallel plate in the medional plane of beam is incident to the half mirror 6 as it is kept as parallel light. The second checking light reflected into the +Z direction by the half mirror 6 travels through the optical path located in the +X direction with respect to the optical axis $AX_3$ of the imaging optical system to enter the imaging lens 13. The light emerging from the imaging lens 13 is focused on the light-receiving surface of the light-receiving device 14.

On the other hand, the second checking light (as shown by the dashed line in FIG. 1) in the sagittal plane of beam emerging from the slit image 12 formed on the measured object 22 is condensed on the light-source-side focal plane 9 of the first objective lens 10 by the first objective lens 10 in the infinite system, and thereafter is incident via the dichroic mirror 8 to the cylindrical lens 7. The second checking light having passed through the cylindrical lens 7 functioning as a positive lens in the sagittal plane of beam travels as parallel light to enter the half mirror 6. The second checking light reflected in the +Z direction by the half mirror 6 travels through the imaging lens 13 to be condensed on the light-receiving surface of the light-receiving element 14.

In this manner the light in the meridional plane of beam and the light in the sagittal plane of beam is focused in a spot shape (point shape) on the light-receiving surface of the light-receiving device 14. This light-receiving device 14 is constructed of a CCD (charge coupled device), which detects the image of the measured object 22 formed on the light-receiving surface.

The light-receiving device 14 photoelectrically converts the image of the measured object 22 formed on the light-receiving surface into an electric signal and outputs the detection electric signal indicating the shape of the image of the measured object 22 to the arithmetic unit 18. The arithmetic unit 18 analyzes the shape of the image of the measured object 22 formed on the light-receiving surface of the light-receiving device 14. This arithmetic unit 18, for example, derives a deviation relative to the optical axis $AX_3$ of the imaging optical system at the position of the barycenter of the image of measured object 22 and outputs an arithmetic electric signal indicating focus information of the first objective lens 10 on the measured object 22 to the control unit 19.

Here, if the surface of the measured object 22 is shifted in the −Z direction from the object-side focal plane 11 of the first objective lens 10, the image of the measured object 22 formed on the light-receiving surface of the light-receiving device 14 becomes deviated in the −X direction from the optical axis $AX_3$ of the imaging optical system. On the other hand, if the surface of the measured object 22 is shifted in the +Z direction from the object-side focal plane 11 of the first objective lens 10, the image of the measured object 22 formed on the light-receiving surface of the light-receiving device 14 becomes deviated in the +X direction from the optical axis $AX_3$ of the imaging optical system.

Because of it, the control unit 19 outputs a control electric signal representing a moving amount of the stage 21 to the drive unit 20 in order to cancel the deviation relative to the optical axis $AX_3$ of the imaging optical system at the position of the barycenter of the image of the measured object 22 formed on the light-receiving surface of the light-receiving device 14. The drive unit 20 outputs a drive electric signal indicating a moving direction of the stage 21 along the optical axis $AX_0$ of the objective optical system to the stage 21.

When the surface of the measured object 22 is moved to approach the object-side focal plane 11 of the first objective lens 10 on this occasion, the image of the measured object 22 similarly formed on the light-receiving surface of the light-receiving device 14 becomes located more symmetric to the optical axis $AX_3$ of the imaging optical system. This causes the control unit 19 to stop the movement of stage 21 when it detects that the deviation relative to the optical axis $AX_3$ of the imaging optical system at the barycenter position of the image of measured object 22 formed on the light-receiving surface of the light-receiving device 14 comes to drop within a predetermined permissible range. Thus, the surface of the measured object 22 becomes aligned in the predetermined permissible range with the object-side focal plane 11 of the first objective lens 10.

As described above, the focus detecting apparatus of the present embodiment can form the slit image on the measured object 22 by the action of the cylindrical lens 7 as minimizing losses of light from the light source. Further, the light from the slit image formed on the measured object 22 can be detected as a point image on the light-receiving surface of the light-receiving device 14. Accordingly, the reflected light emerging from the measured object 22 can be received with efficiency by the small light-receiving surface of the light-receiving device 14.

Figure 4:
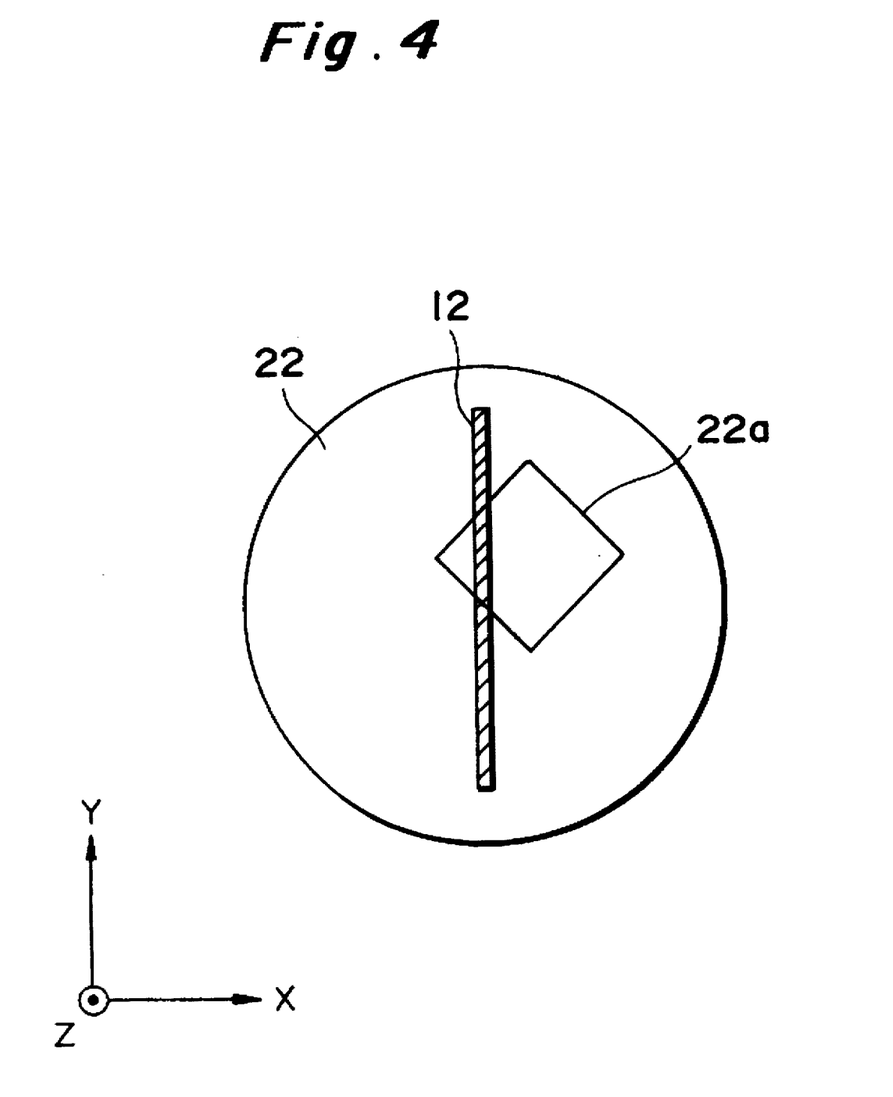
FIG. 4 is a top plan view to show an image formed as a slit image across and on a level-difference edge located in the surface region of the measured object in the vertical illumination microscope apparatus of FIG. 1.

In the focus detecting apparatus of the present embodiment, if the surface of the measured object 22 is not flat, for example if the surface has a level difference like a wafer pattern as shown in FIG. 4, the slit image 12 sometimes intersects with a level-difference edge 22a of a pattern formed on the surface of the measured object 11. Since the rate of optical energy scattered by the level-difference edge 22a in the slit image 12 is small in this case, the apparatus is substantially free of the influence of scattering due to the pattern edge on the detection accuracy.

Figure 5:
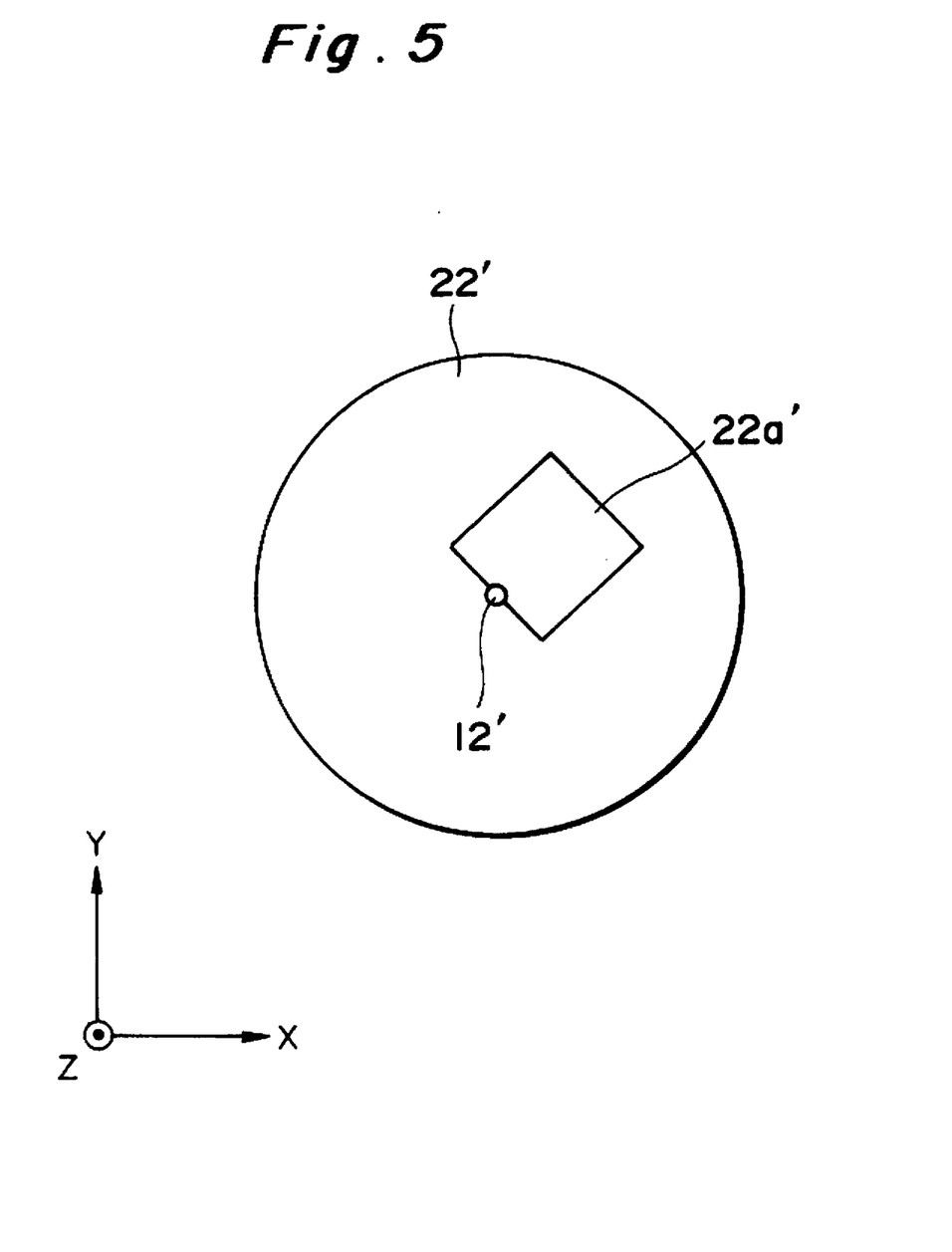
FIG. 5 is a top plan view to show an image formed as a spot image across and on a level-difference edge located in the surface region of the measured object surface in the vertical illumination microscope apparatus equipped with the conventional focus detecting apparatus.

The conventional focus detecting apparatus, however, forms a point image 12' as a light-source image on the measured object 22', as shown in FIG. 5, and thus, if the conventional apparatus is used for the surface of the measured object 22' having the above level difference, most optical energy of the point image 12' will be scattered by the level-difference edge 22a' when the point image 12' intersects with the level-difference edge 22a' of the pattern formed on the surface of the measured object 22'. This decreases regularly reflected light for detecting the focus of the objective lens so as to considerably degrade the detection accuracy, thus possibly causing out-of-focus (defocus) of the vertical illumination microscope apparatus.

If the conventional focus detecting apparatus is arranged to form the slit image on the surface of the measured object by adding a condenser lens and a slit plate between the light source and the collimator lens, the optical system becomes complex because of the condenser lens for illuminating the slit plate where the surface of the measured object has the above level difference. Further, the utilization factor of light becomes extremely low, because most of the light emerging from the light source is interrupted by the slit plate. Thus, intensity of the signal obtained by the light-receiving device becomes insufficient so as to considerably degrade the detection accuracy, thus causing out-of-focus of the vertical illumination microscope apparatus.

Embodiment 2

Figure 6:
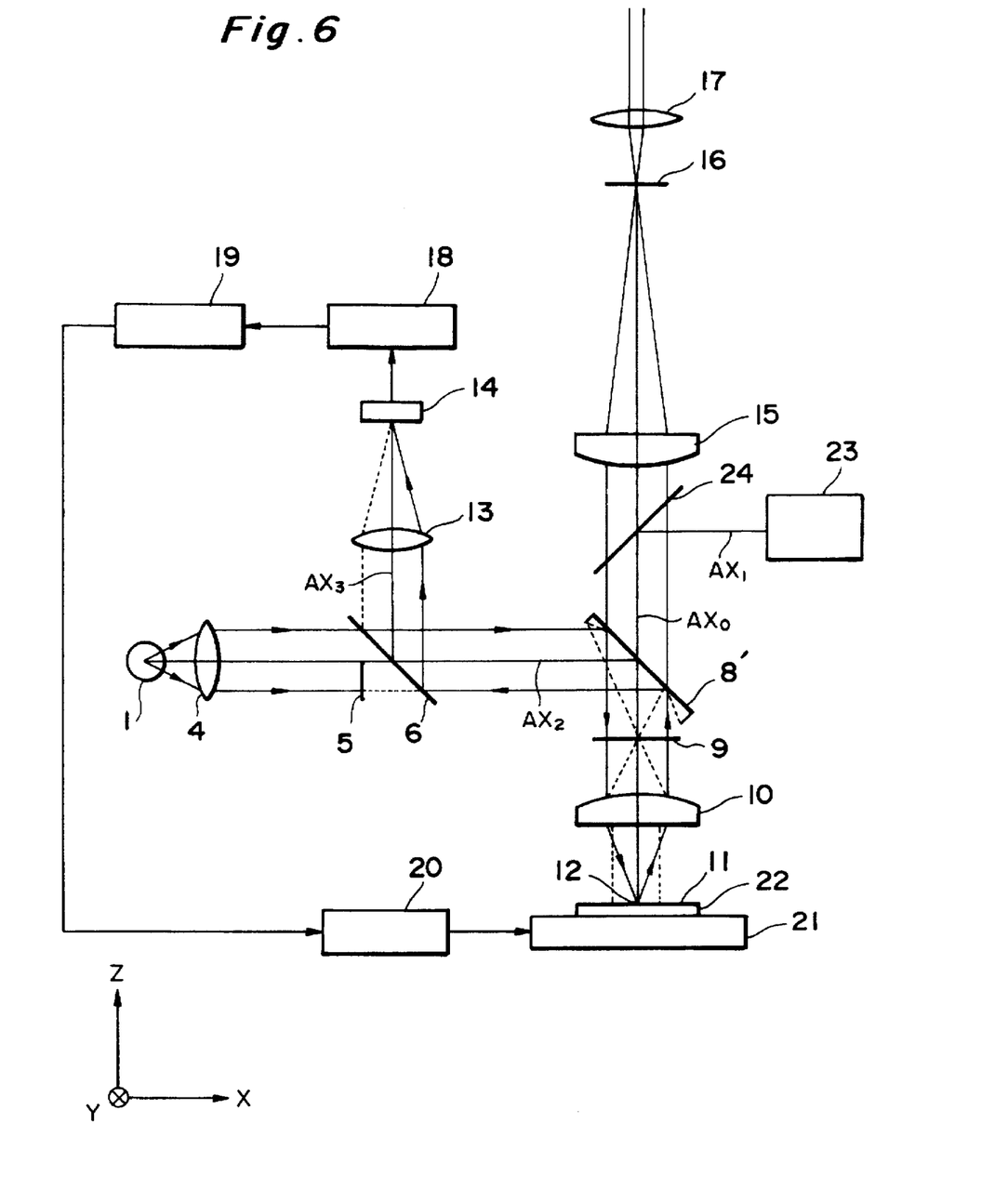
FIG. 6 is a side view of the vertical illumination microscope apparatus of Embodiment 2 and the automatic focus detecting apparatus mounted in the microscope apparatus, schematically showing the overall configuration.

As shown in FIG. 6, the vertical illumination microscope apparatus of the present embodiment is similar to the apparatus of Embodiment 1. However, the focus detecting apparatus mounted in this microscope apparatus is basically different from Embodiment 1 only in that the focus detecting apparatus of the present embodiment excludes the cylindrical lens in Embodiment 1, but the reflecting surface of the dichroic mirror is formed as a toric surface. The present embodiment will be explained focusing on the difference from Embodiment 1.

In the focus detecting apparatus of the present embodiment, the first checking light emitted from the light source 1 travels via the collimator lens 4, the half stop 5, and the half mirror 6 to enter the dichroic mirror 8'.

The reflecting surface of the dichroic mirror 8' is formed to be flat (as shown by the solid line in FIG. 6) in the XZ plane or the meridional plane of beam. Because of it, the dichroic mirror 8' functions as a flat reflector in the meridional plane of beam.

On the other hand, the reflecting surface of the dichroic mirror 8' is formed as a concave surface like a parabolic surface (as shown by the dashed line in FIG. 6) in the XY plane or the sagittal plane of beam. Because of it, the dichroic mirror 8' functions as a concave reflector in the sagittal plane.

As described, the dichroic mirror 8' is the toric mirror having no refractive power in the plane perpendicular to the edge of the half stop 5 intersecting with the optical axis $AX_2$ of the condensing optical system, but having a positive refractive power in the plane parallel to the edge of the half stop 5 and the optical axis $AX_2$ of the condensing optical system. The toric reflecting surface of the dichroic mirror 8' is formed so as to condense the first checking light in the form of a line parallel to the X-axis direction and intersecting with the optical axis $AX_0$ of the objective optical system on the light-source-side focal plane 9 of the first objective lens 10.

The first checking light (as shown by the solid line in FIG. 6) reflected by the dichroic mirror 8' as a flat reflector in the meridional plane of beam is thus condensed through the first objective lens 10 on the object-side focal plane 11 thereof.

On the other hand, the first checking light (as shown by the dashed line in FIG. 6) condensed on the light-source-side focal plane 9 of the first objective lens 10 by the dichroic mirror 8' as a concave reflector in the sagittal plane of beam becomes parallel light through the first objective lens 10 to impinge on the measured object 22.

When the surface of the measured object 22 is located in an in-focus state with the object-side focal plane 11 of the first objective lens 10, the apparatus forms the slit image 12 extending along the Y-axis direction corresponding to the edge direction of the half stop 5 as a light-shielding optical system and intersecting with the optical axis $AX_0$ of the objective optical system in this arrangement.

The second checking light (as shown by the solid line in FIG. 6) in the meridional plane of beam emerging from the slit image 12 formed on the measured object 22 is changed into parallel light by the first objective lens 10 and thereafter the parallel light is incident to the dichroic mirror 8' through the optical path located in the +X direction with respect to the optical axis $AX_0$ of the objective optical system. The second checking light reflected into the −X direction by the dichroic mirror 8' functioning as a plane reflector in the meridional plane of beam is incident to the half mirror 6 as it is kept as parallel light. Then the second checking light reflected into the +Z direction by the half mirror 6 is condensed through the imaging lens 13 on the light-receiving surface of the light-receiving device 14.

On the other hand, the second checking light (as shown by the dashed line in FIG. 6) in the sagittal plane of beam emerging from the slit image 12 formed on the measured object 22 is condensed through the first objective lens 10 on the light-source-side focal plane 9 of the first objective lens 10 and thereafter is incident to the dichroic mirror 8'. The second checking light reflected into the −X direction by the dichroic mirror 8' functioning as a concave reflector in the sagittal plane of beam is changed into parallel light to enter the half mirror 6. The second checking light reflected into the +Z direction by the half mirror 6 is condensed through the imaging lens 13 on the light-receiving surface of the light-receiving device 14.

In this manner the second checking light in the meridional plane of beam and the second checking light in the sagittal plane of beam is focused in a point shape on the light-receiving surface of the light-receiving device 14. This light-receiving device 14 detects the image of the measured object 22 formed on the light-receiving surface.

Also in the focus detecting apparatus constructed in the above arrangement, the focusing operation of the first objective lens 10 is carried out to the measured object 22 by the same feedback control as in above Embodiment 1.

As described above, the focus detecting apparatus of the present embodiment can form the slit image on the measured object 22 by the action of the dichroic mirror 8' as minimizing the losses of the light from the light source. Further, the apparatus can detect the light emerging from the slit image formed on the measured object 22, in the form of the point image on the light-receiving surface of the light-receiving device 14. Accordingly, the reflected light emerging from the measured object 22 can be received with good efficiency by the small light-receiving surface of the light-receiving device 14.

Embodiment 3

Figure 7:
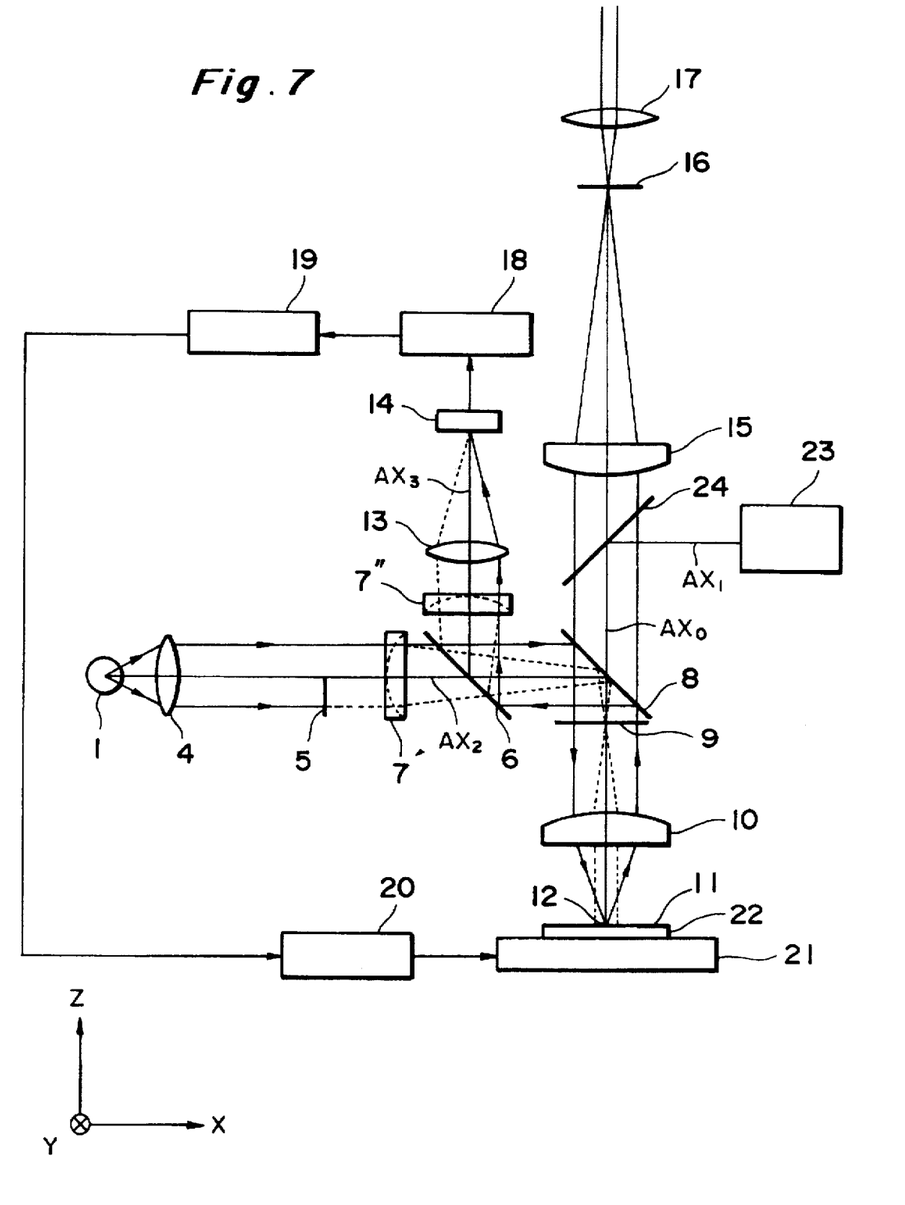
FIG. 7 is a side view of the vertical illumination microscope apparatus of Embodiment 3 and the automatic focus detecting apparatus mounted in the microscope apparatus, schematically showing the overall configuration.

As shown in FIG. 7, the vertical illumination microscope apparatus of the present embodiment is similar to the apparatus of Embodiment 1. However, the focus detecting apparatus mounted in this microscope is basically different from the apparatus of Embodiment 1 only in that the member as the cylindrical lens 7 disposed between the half mirror 6 and the dichroic mirror 8 in Embodiment 1 is replaced by a member as a first cylindrical lens 7' disposed between the half stop 5 and the half mirror 6 and a member as a second cylindrical lens 7" disposed between the half mirror 6 and the imaging lens 13. The present embodiment will be explained as focusing on the difference from Embodiment 1.

In the focus detecting apparatus of the present embodiment, the first checking light emitted from the light source 1 is incident via the collimator lens 4 and half stop 5 to the first cylindrical lens 7'.

In the XZ plane or the meridional plane of beam, neither the light-source-side surface nor the objective-lens-side surface of the first cylindrical lens 7' has the curvature (as shown by the solid line in FIG. 7). Because of it, the first cylindrical lens 7' functions as a plane-parallel plate in the meridional plane.

On the other hand, the light-source-side surface of the first cylindrical lens 7' has a convex curvature on the light source side and the objective-lens-side surface thereof has no curvature (as shown by the dashed line in FIG. 7) in the XY plane or the sagittal plane of beam. Because of it, the first cylindrical lens 7' functions as a positive lens in the sagittal plane.

As described, the first cylindrical lens 7' is the toric lens having no refractive power in the plane perpendicular to the edge of the half stop 5 intersecting with the optical axis $AX_2$ of the condensing optical system, but having a positive refractive power in the plane parallel to the edge of the half stop 5 and the optical axis $AX_2$ of the condensing optical system. The first cylindrical lens 7' is positioned so as to condense the first checking light in the form of a line parallel to the X-axis direction and intersecting with the optical axis $AX_0$ of the objective optical system on the light-source-side focal plane 9 of the first objective lens 10.

The parallel first checking light (shown by the solid line in FIG. 7) having passed through the first cylindrical lens 7' as a plane-parallel plate in the meridional plane of beam is focused via the second half mirror 6, dichroic mirror 8, and the first objective lens 10 on the object-side focal plane 11 of the first objective lens 10.

On the other hand, the first checking light (as shown by the dashed line in FIG. 7) refracted by the first cylindrical lens 7' as a positive lens in the sagittal plane of beam is condensed via the dichroicmirror 8 on the light-source-side focal plane 9 of the first objective lens 10. The first checking light diverging from the light-source-side focal plane of the first objective lens 10 is changed into parallel light through the first objective lens 10 to impinge on the measured object 22.

When the surface of the measured object 22 is located in an in-focus state with the object-side focal plane 11 of the first objective lens 10, the apparatus forms the slit image 12 extending along the Y-axis direction corresponding to the edge direction of the half stop 5 as a light-shielding optical system and intersecting with the optical axis $AX_0$ of the objective optical system.

The second checking light (as shown by the solid line in FIG. 7) in the meridional plane of beam emerging from the slit image 12 formed on the measured object 22 is changed into parallel light through the first objective lens 10 and thereafter the parallel light is incident via the dichroic mirror 8 and half mirror 6 to the second cylindrical lens 7" as it is kept as parallel light.

The second cylindrical lens 7" is constructed in the same arrangement as the first cylindrical lens 7' and is the toric lens having no refractive power in the plane perpendicular to the edge of the half stop 5 intersecting with the optical axis $AX_2$ of the condensing optical system, but having a refractive power of a predetermined value in the plane parallel to the edge of the half stop 5 and the optical axis $AX_3$ of the imaging optical system. The second cylindrical lens 7" is positioned so as to convert the second checking light emerging from the line being parallel to the X-axis direction and intersecting with the optical axis $AX_0$ of the objective optical system on the light-source-side focal plane 9 of the first objective lens 10, into parallel light.

Because of it, the second checking light having passed through the second cylindrical lens 7" functioning as a plane-parallel plate in the meridional plane of beam is incident to the imaging lens 13 as being kept as parallel light. The second checking light emerging from the imaging lens 13 is condensed on the light-receiving surface of the light-receiving device 14.

On the other hand, the second checking light (as shown by the dashed line in FIG. 7) in the sagittal plane of beam emerging from the slit image 12 formed on the measured object 22 is condensed by the first objective lens 10 on the light-source-side focal plane 9 of the first objective lens 10 and thereafter is incident via the dichroic mirror 8 and half mirror 6 to the second cylindrical lens 7". The second checking light having passed through the second cylindrical lens 7" functioning as a positive lens in the sagittal plane of beam is changed into parallel light and then is condensed through the imaging lens 13 on the light-receiving surface of the light-receiving device 14.

In this manner the second checking light in the meridional plane of beam and the second checking light in the sagittal plane of beam is focused in a spot shape (point shape) on the light-receiving surface of the light-receiving device 14. This light-receiving device 14 detects the image of the measured object 22 formed on the light-receiving surface of the light-receiving device 14.

Also in the focus detecting apparatus constructed in the above arrangement, the focusing operation of the first objective lens 10 to the measured object 22 is carried out by the same feedback control as in above Embodiment 1.

As described above, the focus detecting apparatus of the present embodiment forms the slit image on the measured object 22 by the action of the first cylindrical lens 7' as minimizing the losses of the light from the light source. Further, the apparatus can detect the light from the slit image formed on the measured object 22, in the form of a point image on the light-receiving surface of the light-receiving device 14 by the action of the second cylindrical lens 7". Accordingly, the reflected light from the measured object 22 can be received with good efficiency on the small light-receiving surface of the light-receiving device 14.

A modification may be formed by omitting the second cylindrical lens 7" in the present embodiment, and the modification can form the slit image on the measured object 22 by the action of the first cylindrical lens 7' as minimizing the losses of the light from the light source. In this case, the light from the slit image formed on the measured object 22 is detected as a slit image on the light-receiving surface of the light-receiving device 14. Accordingly, this modification necessitates the light-receiving device 14 having such a large light-receiving surface as to match with the slit image in order to increase the utilization factor of light.

It is noted that the present invention is by no means limited to the above embodiments, but the invention may include a variety of modifications and arrangements.

For example, the above embodiments employ the cylindrical lens or the concave reflecting mirror as a toric lens or as a toric mirror, which has no refractive power for the light in the meridional plane of beam but has a refractive power for the light in the sagittal plane of beam. However, the present invention permits use of a toric lens or a toric mirror which has a first positive refractive power for the light in the meridional plane of beam and has a second positive refractive power, different from the first refractive power, for the light in the sagittal plane of beam.

In this case, it becomes necessary to make the objective-lens-side focal plane of the toric lens or the toric mirror nearly coincident with the light-source-side focal plane of the objective lens by changing the refractive power of the collimator lens located between the light source and the toric lens or the toric mirror and changing the incident light to the toric lens or the toric mirror into a diverging wave.

The above embodiments employ the focusing operation of the objective optical system to the measured object as arranged to displace the measured object along the optical axis of the objective optical system by moving the stage holding the measured object by the drive unit. The apparatus, however, may be modified to move the objective optical system and the toric lens or the toric mirror along the optical axis of the entire optical system, thereby making the object-side focal point of the objective optical system coincident with the surface of the measured object.

In the above embodiments, the light-receiving device for detecting the optical image reflected by the measured object is constructed of a CCD. The apparatus, however, may be modified to employ the light-receiving device composed of a plurality of PDs (Photo-Diodes) arranged in symmetry with respect to the optical axis of the imaging optical system, and output terminals of these plural PDs may be connected to input terminals of comparators.

In this case, the control unit derives the deviation to the optical axis of the imaging optical system in the optical image formed on the light-receiving surface of the light-receiving device, based on detection signals output from the comparators, so as to detect focus information of the objective optical system on the measured object and to move the stage, or the objective optical system and the toric lens or the toric mirror etc.

The above embodiments showed examples in which the present invention was applied to the vertical illumination type microscope having the infinite system objective optical system. The present invention, however, can be applied to transmission illumination type microscopes having the infinite system objective optical system, or vertical illumination type microscopes or transmission illumination type microscopes having a finite system objective optical system.

Further, the above embodiments showed the examples in which the present invention was applied to the vertical illumination type microscope, but the present invention can be applied to other optical devices for forming an object image through the objective optical system.

As detailed above, the present invention enables the slit image to be projected onto the surface of the measured object as achieving the light-source projection method with the high utilization factor of light. Accordingly, the invention can substantially cancel the influence of light scattering at the level-difference edge on the surface of the measured object, thereby realizing the focus detecting apparatus that can detect the focus information of the objective optical system on the object with high accuracy and high reliability.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 083407/1995 (7-083407) filed on Mar. 15, 1995 is hereby incorporated by reference.

What is claimed is:

1. A focus detecting apparatus for detecting focus information of an objective optical system on a measured object, comprising:

an image projection unit comprising a light source for emitting first checking light, said image projection unit projecting said first checking light through a first region out of two regions formed by splitting a space into two along a border plane including an optical axis of said objective optical system, onto a surface of said measured object to form an image of said light source thereon; and an image detection unit comprising a photodetector for detecting second checking light emitted from the image of said light source, said image detection unit condensing said second checking light through a second region opposed to said first region with said border plane inbetween, on a light-receiving surface of said photodetector to form an image of said measured object thereon;

wherein said image projection unit comprises a first converging optical system having a first refractive power in a first plane parallel to said border plane, having a second refractive power, substantially different from said first refractive power, in a second plane parallel to the optical axis of said objective optical system and perpendicular to said border plane, and shaping the image of said light source as expanding the image in a direction along an intersecting line between said border plane and said measured object.

2. The focus detecting apparatus according to claim 1, wherein said first converging optical system is a toric lens which is set so as to converge said first checking light incident thereinto from said light source through said first region on a focal plane on a side of said light source in said objective optical system in said first plane and so as to convert said first checking light into a beam parallel to the optical axis of said objective optical system in said second plane.

3. The focus detecting apparatus according to claim 2, wherein said first converging optical system has a positive refractive power as said first refractive power and has the refractive power of zero as said second refractive power.

4. The focus detecting apparatus according to claim 2, wherein said image projection unit comprises a condensing optical system for condensing said first checking light emitted from said light source, and a light-shielding optical system for intercepting said first checking light traveling in said second region and transmitting said first checking light traveling in said first region among said first checking light emerging from said condensing optical system, wherein said image detection unit comprises an imaging optical system for converging said second checking light passing through said second region among said second checking light emerging from the image of said light source, on the light-receiving surface of said photodetector, and wherein said image projection unit and said image detection unit share an optical-path splitting optical system, disposed in an optical path between said light-shielding optical system and said objective optical system, for guiding said first checking light from said light-shielding optical system to said objective optical system and for guiding said second checking light from said objective optical system to said imaging optical system.

5. The focus detecting apparatus according to claim 4, wherein said image projection unit and said image detection unit share said first converging optical system disposed in an optical path between said optical-path splitting optical system and said objective optical system.

6. The focus detecting apparatus according to claim 5, wherein said condensing optical system is a collimator lens for converting said first checking light emitted from said light source into a light beam parallel to the optical axis of said objective optical system, and wherein said first converging optical system is a cylindrical lens having a positive refractive power as said first refractive power and having the refractive power of zero as said second refractive power, said cylindrical lens converging said first checking light emerging from said optical-path splitting optical system on an intersecting line between said first plane including the optical axis of said objective optical system and the focal plane on the side of said light source in said objective optical system.

7. The focus detecting apparatus according to claim 4, wherein said image projection unit has said first converging optical system disposed in an optical path between said light-shielding optical system and said optical-path splitting optical system, and wherein said image detection unit comprises a second converging optical system disposed in symmetry with said first converging optical system with respect to said optical-path splitting optical system in an optical path between said optical-path splitting optical system and said imaging optical system, said second converging optical system having a substantially same structure as said first converging optical system.

8. The focus detecting apparatus according to claim 7, wherein said condensing optical system is a collimator lens for converting said first checking light emitted from said light source into a light beam parallel to the optical axis of said objective optical system, and wherein said first converging optical system is a cylindrical lens having a positive refractive power as said first refractive power and the refractive power of zero as said second refractive power, said cylindrical lens converging said first checking light emerging from said light-shielding optical system on an intersecting line between said first plane including the optical axis of said objective optical system and the focal plane on the side of said light source in said objective optical system.

9. The focus detecting apparatus according to claim 1, wherein said first converging optical system is a toric mirror which is set so as to converge said first checking light incident thereto from said light source through said first region, on the focal plane on the side of said light source in said objective optical system in said first plane and so as to convert said first checking light into a light beam parallel to the optical axis of said objective optical system in said second plane.

10. The focus detecting apparatus according to claim 9, wherein said first converging optical system has a positive refractive power as said first refractive power and has the refractive power of zero as said second refractive power.

11. The focus detecting apparatus according to claim 9, wherein said image projection unit comprises a condensing optical system for condensing said first checking light emitted from said light source, and a light-shielding optical system for intercepting said first checking light traveling in said second region and transmitting said first checking light traveling in said first region among said first checking light emerging from said condensing optical system, wherein said image detection unit comprises an imaging optical system for converging said second checking light passing through said second region among said second checking light emerging from the image of said light source, on the light-receiving surface of said photodetector, and wherein said image projection unit and said image detection unit share an optical-path splitting optical system, disposed in an optical path between said light-shielding optical system and said objective optical system, for guiding said first checking light from said light-shielding optical system to said objective optical system and for guiding said second checking light from said objective optical system to said imaging optical system, and said first converging optical system disposed in an optical path between said optical-path splitting optical system and said objective optical system.

12. The focus detecting apparatus according to claim 11, wherein said condensing optical system is a collimator lens for converting said first checking light emitted from said light source into a light beam parallel to the optical axis of said objective optical system, and wherein said first converging optical system is a mirror having a positive refractive power as said first refractive power and having the refractive power of zero as said second refractive power, said mirror converging said first checking light emerging from said optical-path splitting optical system on an intersecting line between said first plane including the optical axis of said objective optical system and the focal plane on the side of said light source in said objective optical system.

13. The focus detecting apparatus according to claim 1, wherein said photodetector comprises a light-receiving device for receiving the image of said measured object and photoelectrically converting the image received into an electric signal, and an arithmetic unit for analyzing a shape of the image of said measured object, based on the electric signal output from said light-receiving device, thereby detecting a deviation of the image of said measured object relative to the optical axis of said objective optical system, as the focus information of said objective optical system on said measured object.

14. A microscope apparatus for projecting an optical image of a measured object as enlarging said optical image into an observable size, comprising:

a stage for holding said measured object;

an illumination unit for projecting illumination light onto said measured object;

an objective optical system for condensing measurement light emerging from said measured object to focus the measurement light as an image of said measured object;

an eyepiece optical system for projecting the measurement light emerging from the image of said measured object as enlarging the measurement light;

a focus detecting apparatus for detecting focus information of said objective optical system on said measured object;

a control unit for controlling a relative positional relation between said objective optical system and said stage so as to make a focal point on a side of said measured object in said objective optical system coincident in a predetermined permissible range with a surface of said measured object, based on an electric signal output from said focus detecting apparatus; and a drive unit for relatively displacing a position of said objective lens relative to a position of said stage along the optical axis of said objective optical system, based on an electric signal output from said control unit;

wherein said focus detecting apparatus comprises an image projection unit comprising a light source for emitting first checking light, said image projection unit projecting said first checking light through a first region out of two regions formed by splitting a space into two along a border plane including an optical axis of said objective optical system, onto a surface of said measured object to form an image of said light source thereon, and an image detection unit comprising a photodetector for detecting second checking light emitted from the image of said light source, said image detection unit condensing said second checking light through a second region opposed to said first region with said border plane inbetween, on a light-receiving surface of said photodetector to form an image of said measured object thereon, wherein said image projection unit comprises a first converging optical system having a first refractive power in a first plane parallel to said border plane, having a second refractive power, substantially different from said first refractive power, in a second plane parallel to the optical axis of said objective optical system and perpendicular to said border plane, and shaping the image of said light source as expanding the image in a direction along an intersecting line between said border plane and said measured object.

15. The microscope apparatus according to claim 14, wherein said first converging optical system is a toric lens which is set so as to converge said first checking light incident thereinto from said light source through said first region on a focal plane on a side of said light source in said objective optical system in said first plane and so as to convert said first checking light into a beam parallel to the optical axis of said objective optical system in said second plane.

16. The microscope apparatus according to claim 15, wherein said image projection unit comprises a condensing optical system for condensing said first checking light emitted from said light source, and a light-shielding optical system for intercepting said first checking light traveling in said second region and transmitting said first checking light traveling in said first region among said first checking light emerging from said condensing optical system, wherein said image detection unit comprises an imaging optical system for converging said second checking light passing through said second region among said second checking light emerging from the image of said light source, on the light-receiving surface of said photodetector, and wherein said image projection unit and said image detection unit share a first optical-path splitting optical system, disposed between said light-shielding optical system and said objective optical system, for guiding said first checking light from said light-shielding optical system to said objective optical system and for guiding said second objective optical system to said imaging optical system, and a second optical-path splitting optical system, disposed in an optical path between said first optical-path splitting optical system and said objective optical system, for guiding said first checking light from said first optical-path splitting optical system to said objective optical system, for guiding said second checking light from said objective optical system to said first optical-path splitting optical system, and for guiding the measurement light from said objective optical system to said eyepiece optical system.

17. The microscope apparatus according to claim 16, wherein said image projection unit and said image detection unit share said first converging optical system disposed in an optical path between said first optical-path splitting optical system and said second optical-path splitting optical system.

18. The microscope apparatus according to claim 17, wherein said condensing optical system is a collimator lens for converting said first checking light emitted from said light source into a light beam parallel to the optical axis of said objective optical system, and wherein said first converging optical system is a cylindrical lens having a positive refractive power as said first refractive power and having the refractive power of zero as said second refractive power, said cylindrical lens converging said first checking light emerging from said first optical-path splitting optical system on an intersecting line between said first plane including the optical axis of said objective optical system and the focal plane on the side of said light source in said objective optical system.

19. The microscope apparatus according to claim 16, wherein said image projection unit has said first converging optical system disposed in an optical path between said light-shielding optical system and said first optical-path splitting optical system, and wherein said image detection unit comprises a second converging optical system disposed in symmetry with said first converging optical system with respect to said first optical-path splitting optical system in an optical path between said first optical-path splitting optical system and said imaging optical system, said second converging optical system having a substantially same structure as said first converging optical system.

20. The microscope apparatus according to claim 19, wherein said condensing optical system is a collimator lens for converting said first checking light emitted from said light source into a light beam parallel to the optical axis of said objective optical system, and wherein said first converging optical system is a cylindrical lens having a positive refractive power as said first refractive power and the refractive power of zero as said second refractive power, said cylindrical lens converging said first checking light emerging from said light-shielding optical system on an intersecting line between said first plane including the optical axis of said objective optical system and the focal plane on the side of said light source in said objective optical system.

21. The microscope apparatus according to claim 14, wherein said first converging optical system is a toric mirror which is set so as to converge said first checking light incident thereto from said light source through said first region, on the focal plane on the side of said light source in said objective optical system in said first plane and so as to convert said first checking light into a light beam parallel to the optical axis of said objective optical system in said second plane.

22. The microscope apparatus according to claim 1, wherein said image projection unit comprises a condensing optical system for condensing said first checking light emitted from said light source, and a light-shielding optical system for intercepting said first checking light traveling in said second region and transmitting said first checking light traveling in said first region among said first checking light emerging from said condensing optical system, wherein said image detection unit comprises an imaging optical system for converging said second checking light passing through said second region among said second checking light emerging from the image of said light source, on the light-receiving surface of said photodetector, and wherein said image projection unit and said image detection unit share a first optical-path splitting optical system, disposed in an optical path between said light-shielding optical system and said objective optical system, for guiding said first checking light from said light-shielding optical system to said objective optical system and for guiding said second checking light from said objective optical system to said imaging optical system, and a second optical-path splitting optical system, disposed in an optical path between said first optical-path splitting optical system and said objective optical system, for guiding said first checking light from said first optical-path splitting optical system to said objective optical system, for guiding said second checking light from said objective optical system to said first optical-path splitting optical system, and for guiding the measurement light from said objective optical system to said eyepiece optical system.

23. The microscope apparatus according to claim 22, wherein said condensing optical system is a collimator lens for converting said first checking light emitted from said light source into a light beam parallel to the optical axis of said objective optical system, and wherein said first converging optical system is a mirror having a positive refractive power as said first refractive power and having the refractive power of zero as said second refractive power, said mirror converging said first checking light emerging from said first optical-path splitting optical system on an intersecting line between said first plane including the optical axis of said objective optical system and the focal plane on the side of said light source in said objective optical system.

24. The microscope apparatus according to claim 14, wherein said photodetector comprises a light-receiving device for receiving the image of said measured object and photoelectrically converting the image received into an electric signal, and an arithmetic unit for analyzing a shape of the image of said measured object, based on the electric signal output from said light-receiving device, thereby detecting a deviation of the image of said measured object relative to the optical axis of said objective optical system, and outputting the deviation as the focus information of said objective optical system on said measured object, to said control unit.

25. The microscope apparatus according to claim 14, wherein said drive unit moves said stage along the optical axis of said objective optical system, based on an electric signal output from said control unit.

26. The microscope apparatus according to claim 14, wherein said illumination unit comprises a vertical illumination optical system for emitting said illumination light, and third optical-path splitting means, disposed in an optical path between said vertical illumination optical system and said objective optical system, for guiding said illumination light from said vertical illumination optical system to said objective optical system and for guiding said measurement light from said objective optical system to said eyepiece optical system.

* * * * *